(12) United States Patent
Larabie et al.

(10) Patent No.: US 10,131,433 B2
(45) Date of Patent: Nov. 20, 2018

(54) SYSTEM AND METHOD FOR AIRCRAFT PASSENGER SEATING

(71) Applicants: Ron Larabie, Henderson, NV (US); Dave Miller, Henderson, NV (US)

(72) Inventors: Ron Larabie, Henderson, NV (US); Dave Miller, Henderson, NV (US)

( * ) Notice: Subject to any disclaimer, the term of this patent is extended or adjusted under 35 U.S.C. 154(b) by 73 days.

(21) Appl. No.: 15/221,595

(22) Filed: Jul. 28, 2016

(65) Prior Publication Data

US 2018/0029715 A1    Feb. 1, 2018

(51) Int. Cl.
| A47C 7/02 | (2006.01) |
| A47C 7/38 | (2006.01) |
| A47C 7/40 | (2006.01) |
| A47C 7/54 | (2006.01) |
| B23P 6/00 | (2006.01) |
| B64D 11/06 | (2006.01) |

(52) U.S. Cl.
CPC ...... *B64D 11/0639* (2014.12); *B64D 11/0649* (2014.12); *B64D 11/0696* (2013.01); *A47C 7/021* (2013.01); *A47C 7/383* (2013.01); *A47C 7/402* (2013.01); *A47C 7/546* (2013.01); *B23P 6/00* (2013.01); *B64D 11/0693* (2013.01)

(58) Field of Classification Search
CPC ... B23P 6/00; B64D 11/0639; B64D 11/0649; B64D 11/0696; B64D 11/0693; A47C 7/021; A47C 7/402; A47C 7/383; A47C 7/546; A47C 7/52
See application file for complete search history.

(56) References Cited

U.S. PATENT DOCUMENTS

| 2015/0135432 A1* | 5/2015 | Murphy | A47C 17/04 5/29 |
| 2015/0158593 A1* | 6/2015 | Quatmann | B60N 2/26 297/230.1 |
| 2016/0166066 A1* | 6/2016 | Rigmaiden | A47C 7/546 297/227 |

* cited by examiner

*Primary Examiner* — Christopher J Besler
(74) *Attorney, Agent, or Firm* — Lightbulb IP, LLC

(57) ABSTRACT

A system and method for aircraft passenger seating allows traditional passenger seats, which have fixed configurations, to meet new specifications. A bottom frame and backrest frame from a traditional passenger seat is used to form a new passenger seat. Features, such as improved cushioning, telescopic or fixed headrests, rotatable or fixed footrests and improve armrest assemblies may be added as part of the new passenger seat.

7 Claims, 11 Drawing Sheets

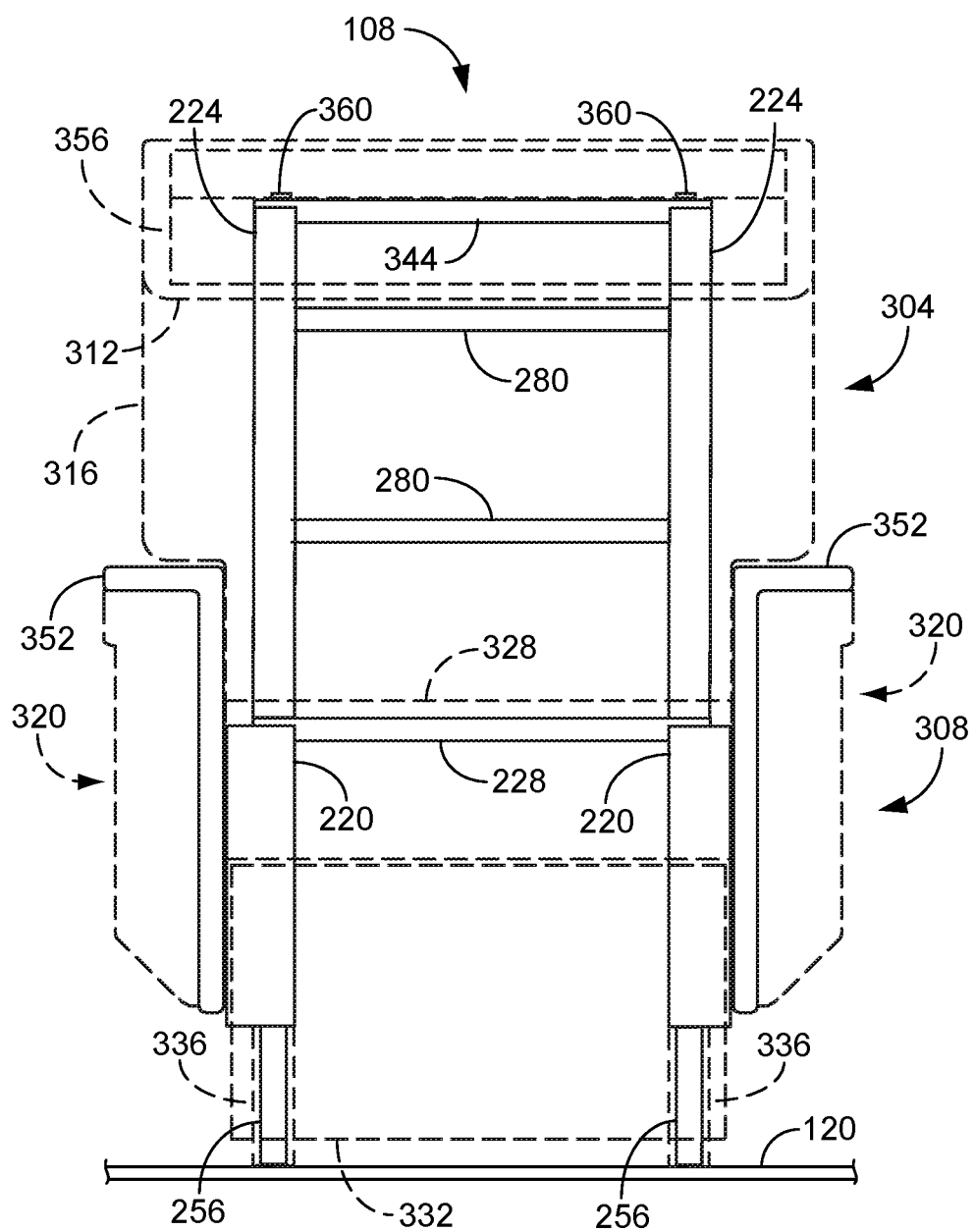

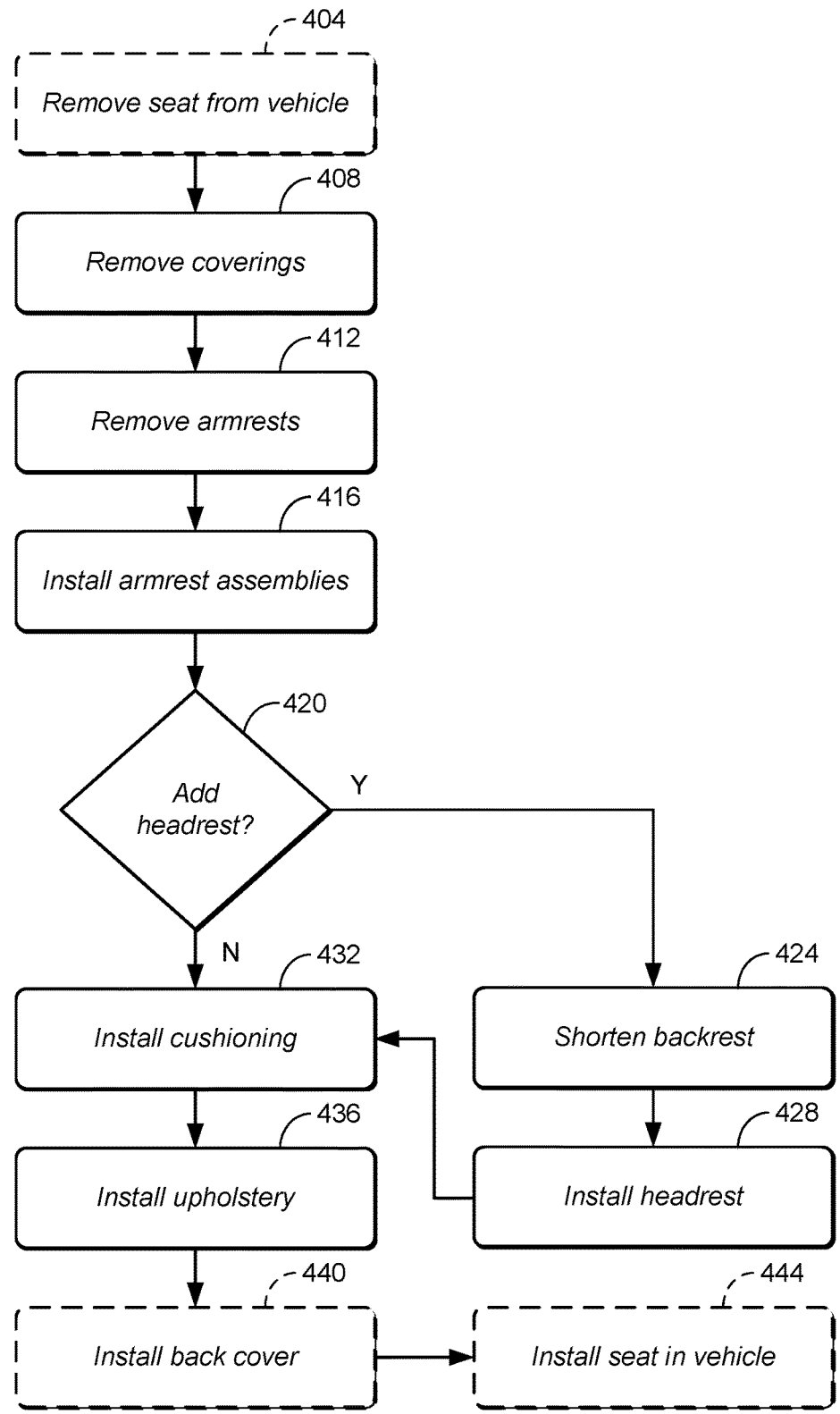

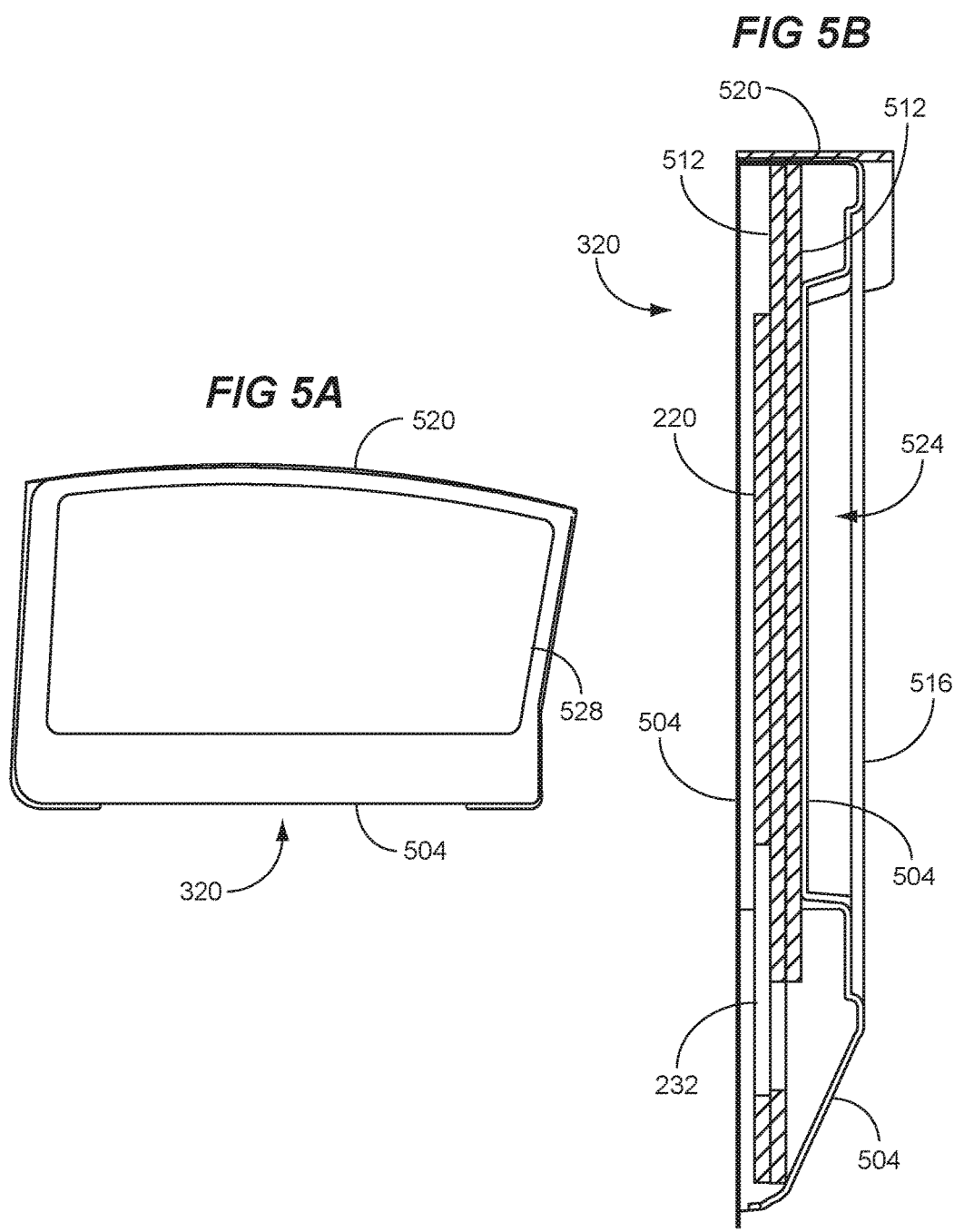

SYSTEM AND METHOD FOR AIRCRAFT PASSENGER SEATING

BACKGROUND OF THE INVENTION

Field of the Invention

The invention relates to vehicular seating and in particular to systems and methods for aircraft passenger seating.

Related Art

As is known, aircraft passenger seats support passengers in a seated position while they are onboard an aircraft. Typically, a passenger seat includes a fixed base, where passengers sit, and a seat back for supporting a passenger's back. Passengers may recline some passenger seat backs to improve their comfort.

Passenger seats may be installed at desired locations on the floor or deck of an aircraft. For example, commercial aircraft typically have passenger seats arranged in rows. In addition, passenger seats may be moved to new locations on the deck of an aircraft.

From the discussion that follows, it will become apparent that the present invention addresses the deficiencies associated with the prior art while providing numerous additional advantages and benefits not contemplated or possible with prior art constructions.

SUMMARY OF THE INVENTION

Systems and methods for aircraft passenger seating are disclosed herein. As will be disclosed herein, the systems and methods improve upon traditional passenger seating and allow such seating to meet new specifications and requirements.

Various methods for making an aircraft passenger seat are disclosed herein along with associated systems to accomplish the same. For instance, in one exemplary embodiment, a method for making an aircraft passenger seat is disclosed, with such method comprising removing a first passenger seat from an aircraft, removing one or more coverings from a bottom frame and a backrest frame of the first passenger seat, removing one or more armrests from the bottom frame, and attaching one or more armrest assemblies at each side of the bottom frame. Each of the one or more armrest assemblies comprise one or more armrest frames and at least one compartment.

A portion of the backrest frame at a distal end of the backrest frame may be removed to shorten the backrest frame to accommodate a headrest. One or more trusses may be attached at the distal end of the backrest frame to ensure structural integrity of the shortened backrest frame. A headrest may be attached at the distal end of the backrest frame. This headrest comprises a headrest frame. At least the bottom frame, the backrest frame and the headrest frame may be covered with one or more coverings, with the outermost covering being upholstery. A back cover may be secured at a rear side of the backrest frame.

The compartment of the one or more armrest frames may be enclosed with a removable cover. In addition, the headrest further may comprise a downrod that is inserted into a channel of the backrest frame to allow the headrest to extend and retract from the backrest frame, such as in a telescopic fashion.

A base at a bottom end of the bottom frame may be attached to a deck of the aircraft to install the passenger seat in the aircraft. Also, a shroud may be attached at the base to hide the base from view. A footrest may be attached to the bottom frame as well. It is noted that the footrest may be rotatably attached to the bottom frame.

In another exemplary embodiment, a method for making an aircraft passenger seat comprises removing one or more coverings from a bottom frame and a backrest frame of a first passenger seat, removing one or more armrests from the first passenger seat, and shortening the backrest frame to form a shortened backrest frame.

This exemplary method also includes attaching one or more trusses at a distal end of the shortened backrest frame, attaching a headrest at the distal end of the shortened backrest frame, attaching one or more armrest assemblies to the bottom frame, and covering at least the bottom frame and the backrest frame with one or more coverings. The outermost covering is upholstery.

A compartment may be formed at an exterior surface of the one or more armrest assemblies, such as for storage of equipment or passenger items. A back cover may be secured at a rear side of the backrest frame. It is noted that the headrest may include a downrod that is inserted into a channel of the backrest frame when the headrest is attached to the shortened backrest frame. This allows the headrest to extend and retract.

Similar to above, a base at a bottom end of the bottom frame may be attached to a deck of the aircraft to install the passenger seat in the aircraft. A shroud may be attached at the base to hide the base from view, and a footrest may be attached to the bottom frame.

In yet another exemplary embodiment, a method for making a second aircraft passenger seat is disclosed, with such method comprising selecting a first passenger seat that comprises a bottom frame and a backrest frame and is attached to a deck of an aircraft, removing one or more coverings from the first passenger seat, and removing one or more armrests from the first passenger seat.

The second aircraft passenger seat may then be formed by shortening the backrest frame to create a shortened backrest frame, attaching a headrest at a distal end of the shortened backrest frame, attaching one or more armrest assemblies to the bottom frame, and covering the bottom frame, the backrest frame and the one or more armrest assemblies with one or more coverings with the outermost covering being upholstery.

One or more trusses may be attached at the distal end of the shortened backrest frame to help ensure structural integrity of the shortened backrest frame. A compartment may be formed at an exterior surface of the one or more armrest assemblies, such as to store equipment of passenger items. This compartment may be enclosed with a removable cover. A back cover may be secured at a rear side of the backrest frame.

It is noted that, similar to above, the headrest may include a downrod that is inserted into a channel of the backrest frame when the headrest is attached to the shortened backrest frame. This allows the headrest to extend and retract.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 3D is a front cross sectional view of an exemplary second passenger seat;

FIG. 4 is a flow diagram illustrating an exemplary method for making a second passenger seat;

FIG. 5A is a side view of an exemplary armrest assembly;

FIG. 5B is a front cross sectional view of an exemplary armrest assembly;

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Traditionally, aircraft passenger seats have a fixed configuration and therefore can no longer be used once their specifications are no longer suitable or desired for a particular application. The passenger seats disclosed herein address this deficiency while providing lightweight and comfortable seating for aircraft passengers. In addition, the passenger seats improve upon the functionality of traditional passenger seats.

Though described herein with regard to aircraft, it is contemplated that the passenger seats and methods therefor may be used with a variety of vehicles, such as cars, trucks, vans, trains, boats and buses.

Figure 1:
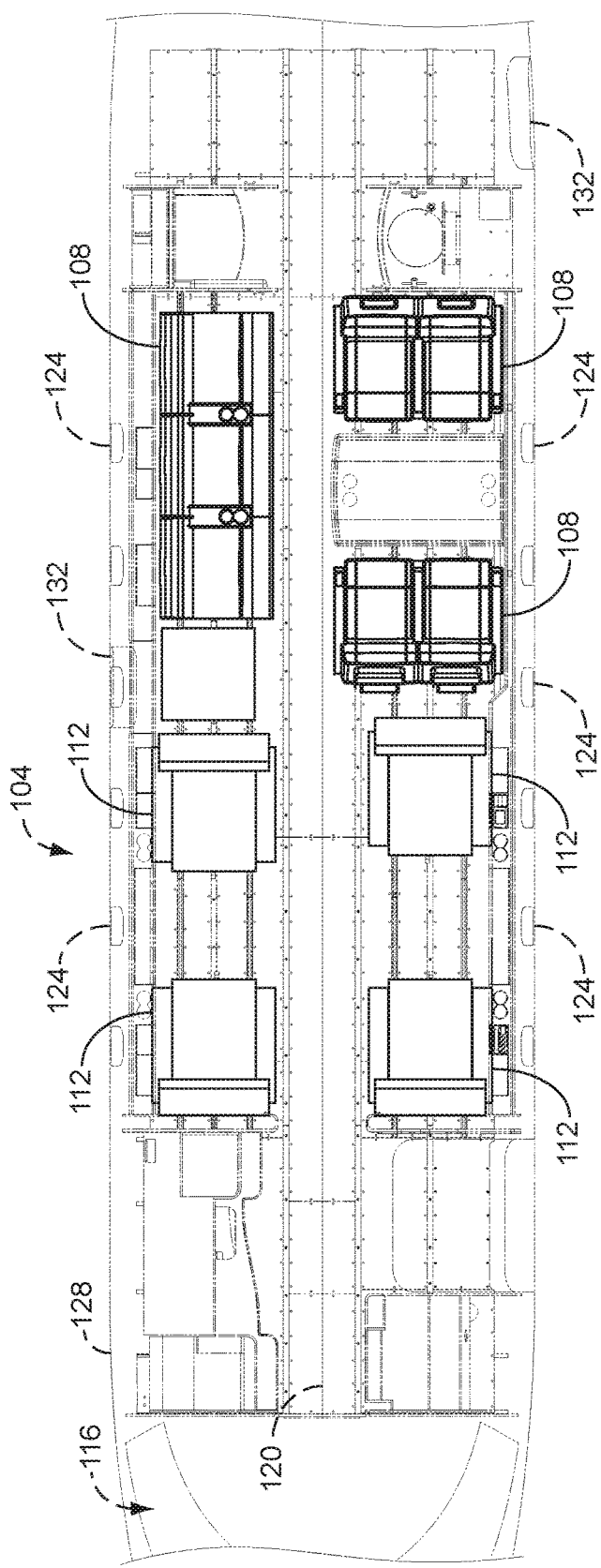
FIG. 1 is a top view of an exemplary aircraft interior.

FIG. 1 illustrates a top view of an exemplary environment where the passenger seat may be installed. Specifically, FIG. 1 shows the interior of an exemplary aircraft 104. As can be seen, an aircraft 104 typically comprises a fuselage 128, with a cockpit 116 at one end and a tail (not shown) at the opposite end. A fuselage 128 typically encloses the interior of an aircraft 104. A fuselage 128 may also comprise one or more windows 124 to provide a view, and one or more doors 132 for passenger ingress and egress.

A floor or deck 120 is inside the fuselage 128. A deck 120 may support various interior fixtures or furnishings, such as tables, toilets, and lavatories. A deck 120 may also support passenger seats 108, 112. As shown in FIG. 1, different types of passengers seats 108, 112 are installed on the deck 120. Namely, a plurality of first passenger seats 112 are located towards the front of the aircraft 104, while a plurality of second passenger seats 108 are installed towards the rear of the aircraft. As will be described herein, a second passenger seat 108 will typically be formed or made from a first passenger seat.

Figure 2:
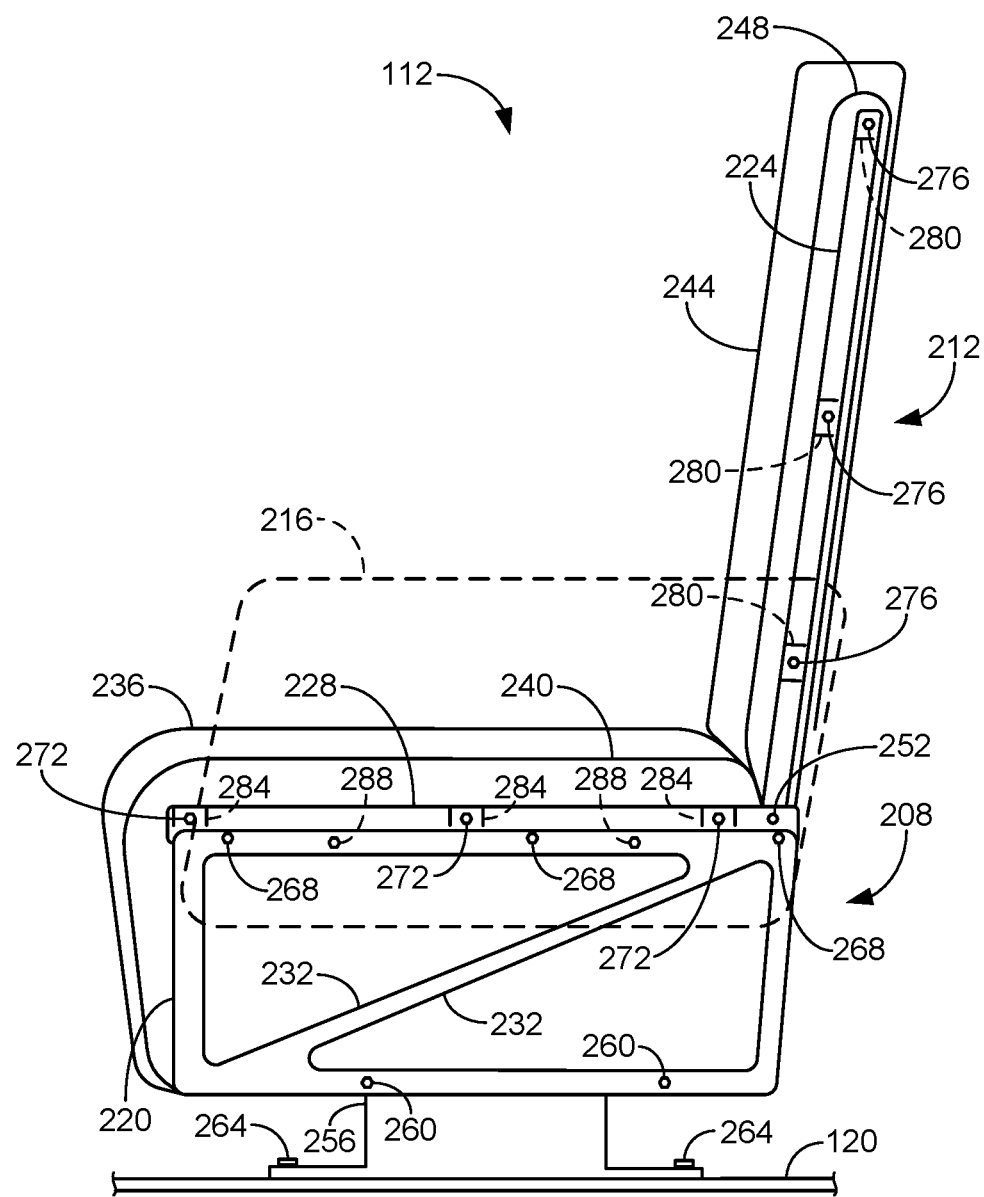
FIG. 2 is a side cross sectional view of an exemplary first passenger seat.

FIG. 2 is a side cross sectional view of an exemplary first passenger seat 112. A first passenger seat 112 may comprise a bottom assembly 208 and a backrest assembly 212. Typically, a bottom assembly 208 provides a structure upon which a passenger sits, and which supports the weight of the passenger. Typically, a backrest assembly 212 provides a structure that supports a passenger's back. A bottom assembly 208 may be secured to a deck 120 of an aircraft or other structure by a base 256. As can be seen, one or more fasteners 264, such as screws, may be used to secure a base 256 to a deck 120.

A bottom assembly 208 may comprise one or more bottom frames 220. Typically, a bottom frame 220 will be a rigid structure preferably formed from lightweight material, such as aluminum. It is contemplated that a bottom frame 220 may comprise one or more members attached together to form the bottom frame, may be formed from a single piece of material or both. A bottom frame 220 may have one or more openings 232 to reduce its weight. Though shown as triangular, it is contemplated that an opening 232 may be various other shapes and sizes.

One or more lateral supports 228 are typically attached, at a horizontal orientation, to a bottom frame 220. A lateral support 228 provides a structure that supports the weight of a passenger sitting thereon, and will typically extend from one side of a first passenger seat 112 to the other. Some exemplary lateral supports 228 include frames (comprising one or more members), seat pans or plates, and trusses or other members. A lateral support 228 may be attached to one or more bottom frames 220 by one or more fasteners 268. Some exemplary fasteners 268 including screws, pins, rivets or other mechanical fasteners. Alternatively or in addition, a lateral support 228 may be attached by one or more welds or adhesive.

One or more coverings 236, 240 may be part of a bottom assembly 208 as well. It is noted that one or more inner coverings 240 and outer coverings 237 may be provided. For example, an inner covering 240 comprising padding may be covered by an outer covering 236 comprising upholstery. This provides cushioning for a passenger.

A backrest assembly 212 may comprise one or more backrest frames 224. Similar to above, a backrest frame 224 will typically be a rigid structure preferably formed from lightweight material, such as aluminum. A backrest frame 224 may be a single structure or may be formed from one or more members or other subparts. It is contemplated that a backrest frame 224 may have one or more openings to reduce weight, if desired.

One or more trusses 280 may be attached to one or more backrest frames 224, and will typically extend from one side of a first passenger seat 112 to the other. A truss 280 may be attached by one or more fasteners 276. Some exemplary fasteners include screws, pins, rivets and other mechanical fasteners. Alternatively or in addition, a truss 280 may be attached to one or more backrest frames by adhesive or one or more welds. It is contemplated that a truss 280 may be a rigid structure, such as a member formed from aluminum.

One or more coverings 248, 244 may be part of a backrest assembly as well. Similar to above, one or more inner coverings 248 and one or more outer coverings 244 may be provided. An inner covering 248 may be padding, while an outer covering 244 may be upholstery, for example. As can be seen, inner coverings 248 will typically provide cushioning, while outer coverings 244 cover the inner coverings and provide protection, comfortable seating surfaces, aesthetics or various combinations thereof.

An armrest 216 may be attached at both sides of a first passenger seat 112. Typically, an armrest 216 will be attached to a bottom assembly 208. For example, an armrest 216 may be attached to a bottom frame 220 by one or more fasteners 288, such as one or more screws, pins, rivets or other mechanical fasteners, or by adhesive or one or more welds.

A bottom assembly 208 and a backrest assembly 212 may be joined or secured to one another in various ways. As shown in FIG. 2 for example, one or more rotatable mounts 252, namely a hinge, rotatably attaches the bottom assembly 208 to the backrest assembly 212. In operation, a first portion of a rotatable mount 252 rotates relative to a second portion of the rotatable mount, such as about a pivot pin, axel or the like. It is noted that various rotatable mounts may be used. The rotation of one or more rotating mounts 252 allow a backrest assembly to rotate between an upright position and a reclined position. Alternatively, a backrest assembly 212 may be attached to a bottom assembly 208 in a fixed (i.e., non-rotatable) fashion, such as by one or more screws, pins, rivets or other mechanical fasteners, or by adhesive or one or more welds.

Figure 3A:
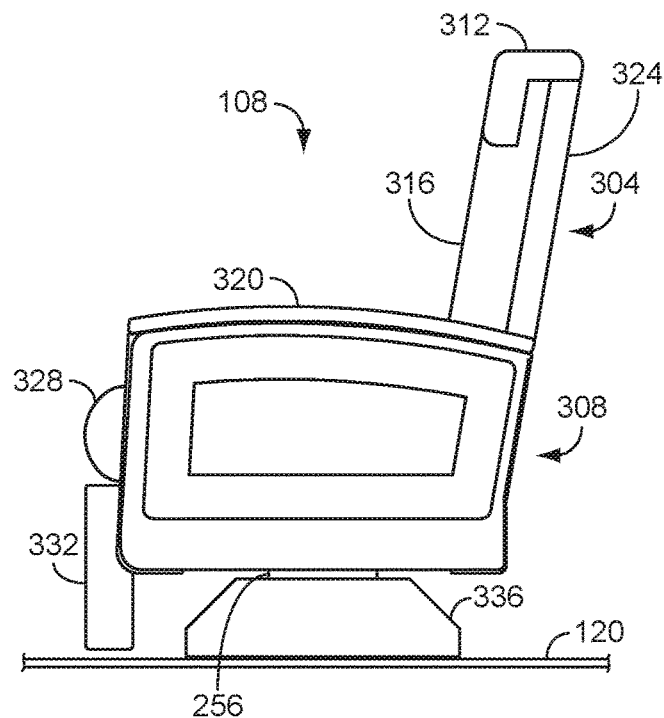
FIG. 3A is a side view of an exemplary second passenger seat.
Figure 3B:
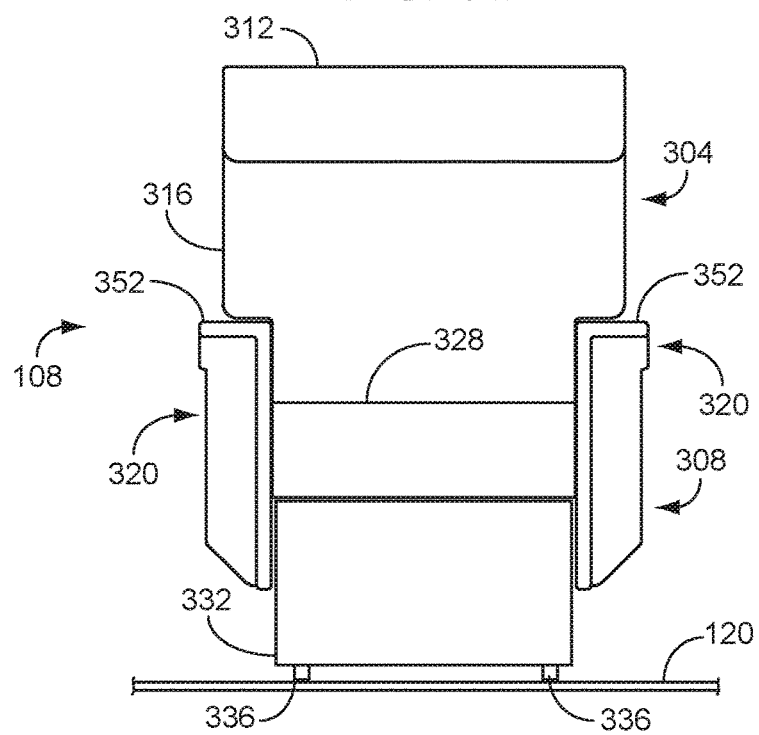
FIG. 3B is a front view of an exemplary second passenger seat.

FIGS. 3A and 3B respectively illustrate a side and front view of an exemplary second passenger seat 108. As will be described further below, a second passenger seat 108 may be formed from a portion of a first passenger seat. This is advantageous in that a first passenger seat that no longer has desirable specifications can be made into a second passenger seat 108 with desirable specifications. Since a portion of a first passenger seat is used in this process, material cost and waste is reduced.

As can be seen, a second passenger seat 108 may comprise a bottom assembly 308 and a backrest assembly 304. Similar to above, a bottom assembly 308 provides a seating surface for a passenger, and supports the weight of a seated passenger. A backrest assembly 308 supports a passenger's back, and may be rotatable such as to move between an upright position and a reclined position. It is noted that a backrest assembly 308 may be fixed in some embodiments. A back end of a backrest assembly 308 may be covered by a back cover 324.

A bottom assembly 308 may include a seat cushion 328 and a footrest 332, while a backrest assembly 304 may include a back cushion 316 and a headrest 312. A second passenger seat 108 may also comprise an armrest assembly 320 on each of its sides as well. Each armrest assembly 320 may comprise an armrest frame 352.

A headrest 312 may telescope or move between a retracted position and an extended position. In addition, a headrest 312 may also be rotatable. A footrest 332 may comprise a footrest frame 364 and be rotatable, such as by rotatably mounting the footrest frame to a bottom frame 220 with one or more hinges or other rotatable mounts 368. It is contemplated that a footrest 332 may also be attached to a bottom frame 220 in a fixed fashion so that it does not rotate. A footrest 332 and headrest 312 help to increase passenger comfort in general and relative to a first passenger seat. In addition, a second passenger seat 108 will typically include additional functionality relative to a first passenger seat, as will be disclosed further below.

A bottom assembly 308 may be secured to a deck 120 of an aircraft or other structure by a base 256. This attaches the second passenger seat to the deck of the aircraft. For example, one or more fasteners, such as screws, may be used to secure a base 256 to a deck 120. One or more shrouds 336 may be provided to hide at least a portion of a base 256, such as to improve the aesthetic appearance thereof.

Figure 3C:
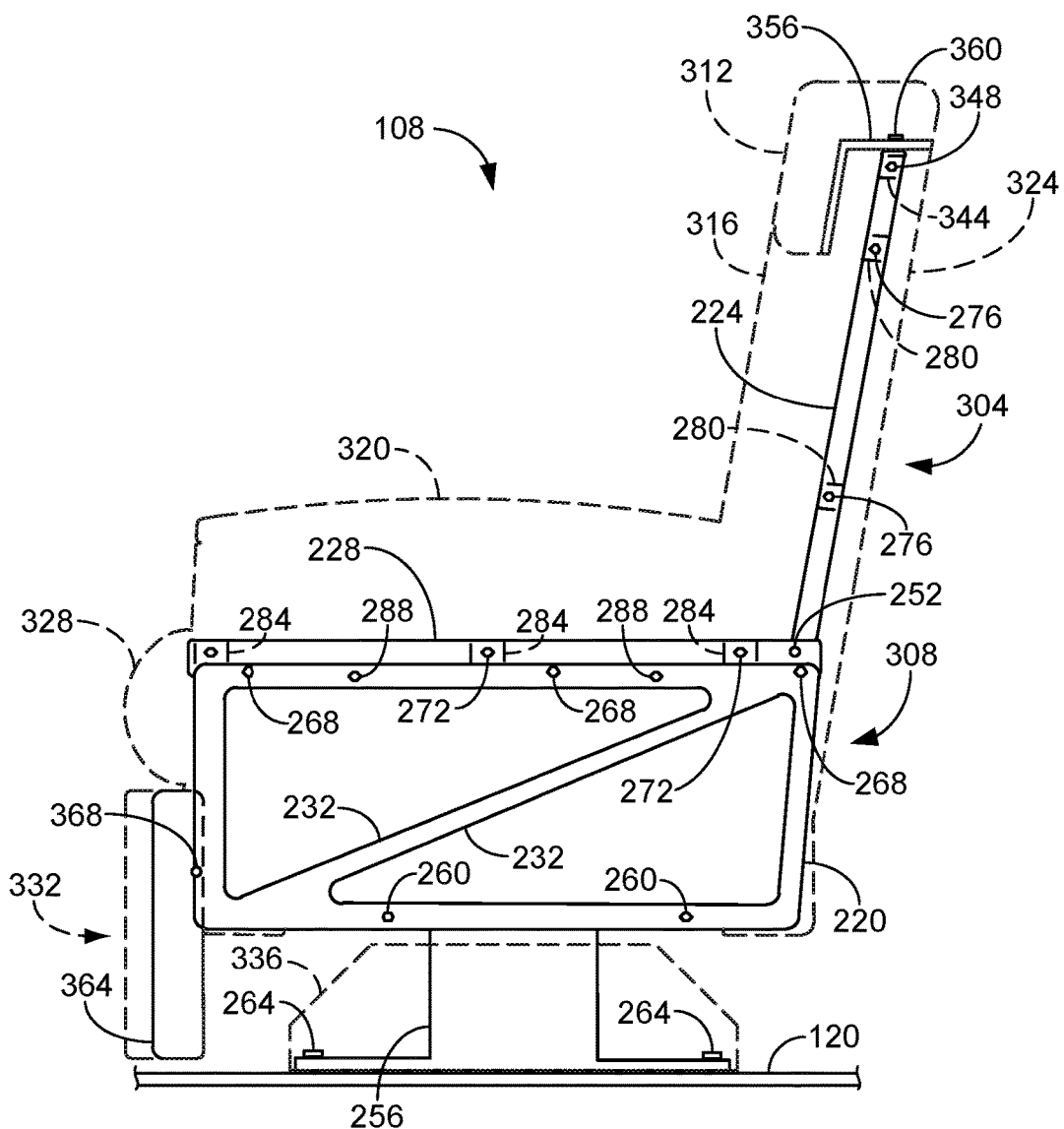
FIG. 3C is a side cross sectional view of an exemplary second passenger seat.

FIGS. 3C and 3D respectively illustrate side and front cross sectional views of an exemplary second passenger seat 108. As can be seen, a second passenger seat 108 may share at least some of the internal componentry as a first passenger seat. As shown in FIGS. 3C and 3D for example, a second passenger seat 108 may have a bottom assembly 308 and a backrest assembly 304. The bottom assembly 308 and backrest assembly 304 may respectively comprise one or more bottom frames 220 and one or more backrest frames 224 from a first passenger seat. These bottom and backrest frames 220, 224 may respectively support the components of a bottom assembly 308 and backrest assembly 304, as also described above with respect to the first passenger seat. To illustrate, a bottom frame 220 may support one or more lateral supports 284, while a backrest frame may support one or more trusses 280.

A seat cushion 328 and footrest 332 may be attached to a bottom frame 220, one or more lateral supports 284 thereof, or both. As can be seen, a seat cushion 328 and footrest 332 may cover a bottom frame 220 and its lateral supports 284, and provide a padding for passenger comfort.

One or more armrests assemblies 320 may also be attached to a bottom frame 220. An armrest assembly's armrest frame 352 may be attached to a bottom frame 220 with one or more fasteners 288, adhesive, welds or the like.

A back cushion 316 and headrest 312 may be attached to a backrest frame 224, one or more trusses 280 thereof, or both. As can be seen, a back cushion 316 may cover the backrest frame 224, and provide a padded surface for passenger comfort.

One or more portions of a first passenger seat may be altered in making a second passenger seat 108. For example, in the exemplary embodiments of FIGS. 3C and 3D, a new truss 344 has been attached to the backrest frame 224, and the backrest frame 224 has been shortened such that its distal end now terminates at the new truss 344. This allows the backrest assembly 304 to accommodate a headrest 312.

A headrest 312 may comprise a headrest frame 356 attached to a backrest frame 224 by one or more fasteners 360, such as screws, pins, rivets or other mechanical fasteners, or adhesive or welds. A headrest frame 356 may support one or more coverings, such as padding and upholstery as shown, to improve passenger comfort.

FIG. 4 is a flow diagram illustrating an exemplary process by which a first passenger seat is made into a second passenger seat. At a step 404, a first passenger seat may be removed from an aircraft by disconnecting the first passenger seat from the deck of the aircraft. Referring to FIG. 2, one or more fasteners 264 may be removed to disconnect the base 256 of a first passenger seat 112 from the aircraft's deck 120, for example. As indicated by the broken line illustration of step 404, removal from an aircraft is optional in some embodiments since the process may be performed with the first passenger seat 112 in place (i.e., with a first passenger seat 112 secured to an aircraft's deck 120).

At a step 408 one or more coverings 236, 240, 244, 248 of a bottom assembly 208 and a backrest assembly 212 may be removed. This may be accomplished by pulling one or more coverings 236, 240, 244, 248 off, cutting the coverings, scraping the coverings off or various combinations thereof. All coverings 236, 240, 244, 248 will typically be removed. Alternatively, it is contemplated that a subset of the coverings 236, 240, 244, 248 may be removed in some embodiments. For example, only inner coverings 240, 248 may be removed in some embodiments thereby leaving the padding of the first passenger seat 112, or at least a portion of the padding, in place.

At a step 412, the armrests 216 may be removed, for example by removing the fasteners 288 that secure the armrests to a bottom frame 220. Though the above removal processes have been described as involving removal of fasteners, it is noted that adhesive or welds or other bonds may connect various structures together. In such cases, these bonds may be broken, such as by cutting through or away these bonds.

At a step 416 armrest assemblies of a second passenger seat may be installed. Referring to FIGS. 3A-3D for example, one or more armrest assemblies 320 may be installed by attaching their armrest frames 352 to a bottom frame 220, such as with one or more fasteners 288. Fasteners 288 may be the same or similar to those used on a first passenger seat, such as screws, pins, staples and rivets. It is noted that adhesive, welds or other bonds may be used to attach components of a second passenger seat to one another.

At a decision step 420, if a headrest is desired, the backrest assembly 212 may be shortened at a step 424. This may be accomplished by shortening the backrest frame 224, such as by cutting the backrest frame. As can be seen via a comparison of FIGS. 2 and 3C, the backrest frame 224 has been shortened.

One or more new trusses 344 may be installed at the distal end of the backrest frame 224 to ensure structural integrity of the shortened backrest frame. A new truss 344 may be attached to a shortened backrest frame 224 by one or more fasteners 348, such as screws, pins, staples and rivets, or adhesive or welds.

A headrest 312 may be installed at a step 428 by attaching the headrest 312 to the backrest frame 224. This may be accomplished by attaching the headrest frame 356 of a headrest 312 to a backrest frame 224 with one or more fasteners 360, such as those described above. Typically, a headrest 316 will be attached at a distal end of the backrest frame 224, such as shown in FIGS. 3C and 3D.

At a step 432, one or more coverings, namely, cushioning may be installed to cover at least a portion of the bottom assembly 308, the backrest assembly 304 or both. Cushioning may cover at least a portion of the bottom frame 220, one or more lateral supports 228 thereof or both. This cushioning will typically form a resilient or padded structure of a seat cushion 328, footrest 332 or both. Cushioning may also be installed to cover at least a portion of the backrest frame 224, one or more trusses 280 thereof or both. This cushioning will typically form a resilient or padded structure of a back cushion 316. Cushioning may also be installed to form a resilient or padded structure for a headrest 312, such as by attaching cushioning to a headrest frame 356. As will be described further below, cushioning may be attached with one or more adhesives, such as spray or other adhesive.

At a step 436, the bottom assembly 308, the backrest assembly 304 or both may be covered with upholstery. Typically, upholstery will cover the cushioning installed at step 432. It is contemplated that upholstery may also cover other elements of a second passenger seat 108, such as any exposed portion of its bottom frame 220, backrest frame 224, and other componentry.

At a step 440, a back cover 324 may be installed at the back end of the backrest assembly 304 such as by attaching the back cover 324 to the backrest frame 224. One or more fasteners, such as screws, pins, staples and rivets, or adhesive or welds may be used to attach a back cover 324. Alternatively or in addition, a back cover 324 may have a structure which attaches to a backrest frame 224 via one or more friction or snap fit connectors or connections. As indicated by the broken lines illustrating step 440, a back cover 324 and installation thereof are optional since a back end of a backrest assembly 304 may be left uncovered or covered with upholstery at step 436.

At this point a second passenger seat 108 formed from a first passenger seat may be deemed complete and ready for use, installation or both. At a step 444, the completed second passenger seat 108 may be installed in an aircraft, such as by attaching its base 256 to the aircraft's deck with one or more fasteners 264. As indicated by the broken lines illustrating step 444, installation in an aircraft is optional. It is contemplated that, once completed, a second passenger seat 108 may be delivered to a third party for installation in aircraft.

As can be seen from FIG. 4, if a headrest is not desired a backrest assembly 304 and backrest frame 224 need not be shortened, a headrest 312 is not installed, and the process of making a second passenger seat may continue directly to step 432 where one or more coverings are installed.

FIGS. 5A and 5B respectively illustrate side and cross sectional views of an exemplary armrest assembly 320. As can be seen, an armrest assembly 320 may comprise a shell 504 that generally forms or provides a peripheral shape to an armrest assembly. A shell 504 may be a hollow structure or enclosure that encloses various components of an armrest assembly 320. For example, a shell 504 may house one or more armrest frames 512 that provide a rigid structure for an armrest assembly 320. A top plate 520 may be included to provide a surface that supports the weight of a passenger's arm.

In one or more embodiments, a shell 504 may form or otherwise comprise one or more compartments 524 at its exterior surface. As shown in FIG. 5B for example, the shell 504 comprises an indented area which forms a compartment 524. A compartment 524 may be enclosed by one or more covers 516, which may be permanently or removably affixed. It is contemplated that a compartment 524 may be used to store or house various items. For example, a compartment 524 may store passenger items or electronic or other accessories of a second passenger seat, such as electrical outlets or data ports.

As disclosed above, an armrest assembly 320 may be attached to a second passenger seat in various ways. In the exemplary embodiment of FIG. 5B, the armrest assembly 320 has its armrest frame 512 attached to a portion of a bottom frame 220. Though shown as a panel in FIG. 5B, it is contemplated that a bottom frame 220 may be formed from various structures, as described above.

Figure 6A:
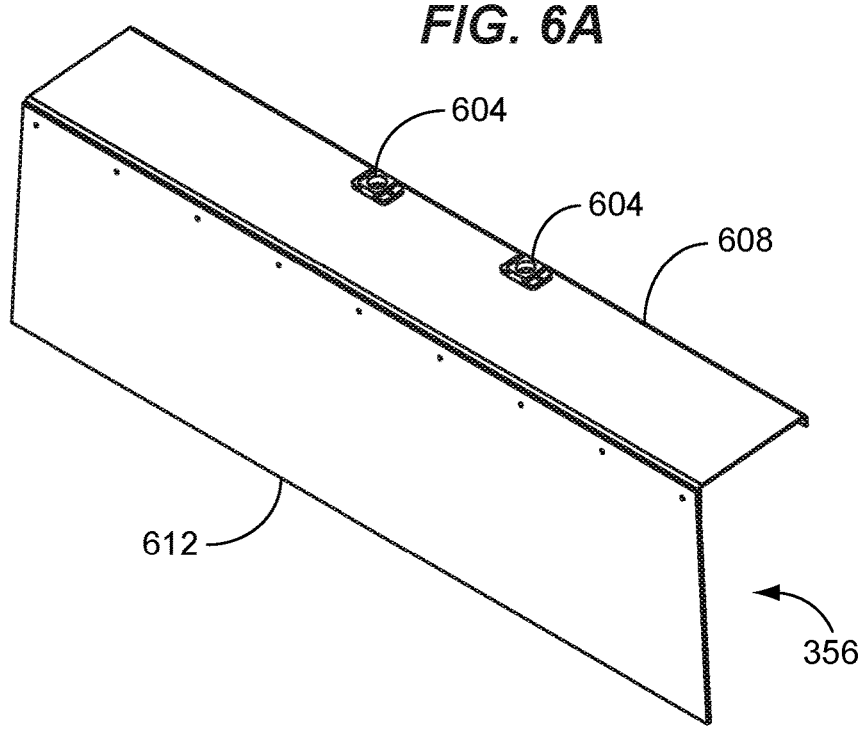
FIG. 6A is a perspective view of an exemplary headrest frame.
Figure 6B:
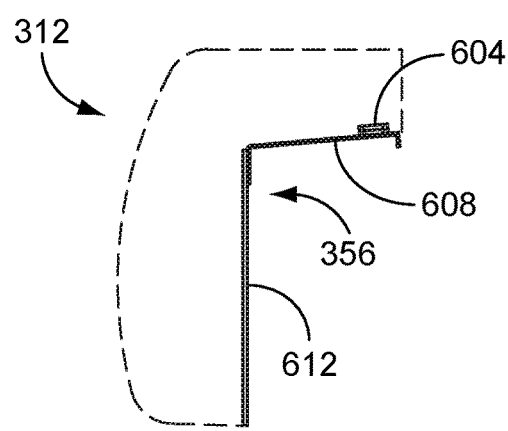
FIG. 6B is a side view of an exemplary headrest.

FIGS. 6A and 6B respectively illustrate front perspective and side views exemplary headrest frame 356 for a headrest 312. As can be seen, a headrest frame 356 may be a generally planar structure having a bend between its top portion 608 and bottom portion 612. It is contemplated that a headrest frame 356 may be formed from a single piece of material, or have subparts attached together. In the exemplary embodiment of FIGS. 6A and 6B for example, the top portion 608 and bottom portion 612 are separate planar structures that are attached together.

Figure 6C:
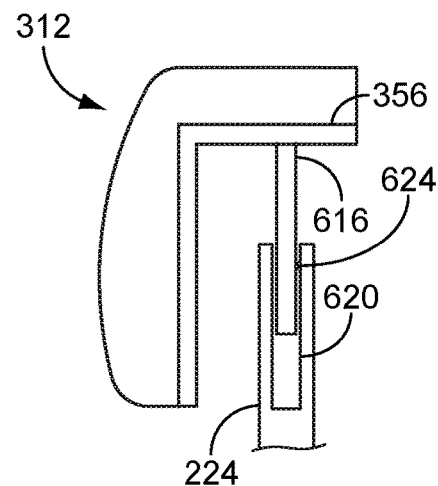
FIG. 6C is a side cross sectional view of an exemplary headrest.

In one or more embodiments, a headrest 312 may be telescopic so as to extend upward and retract downward to suit various passengers. As shown in the cross sectional view of FIG. 6C, a headrest frame 356 may have a downrod 616 or other member attached thereto. A corresponding channel 620 or opening may be formed in the distal end of a backrest frame 224 to accept the downrod 616, and hold a headrest 312 at various elevations. A channel 620 may provide a friction fit with a downrod 616 to hold a headrest in position. Alternatively or in addition, a mechanical stop, such as a pin 624 may engage a downrod 616 to hold it in position.

Figure 7A:
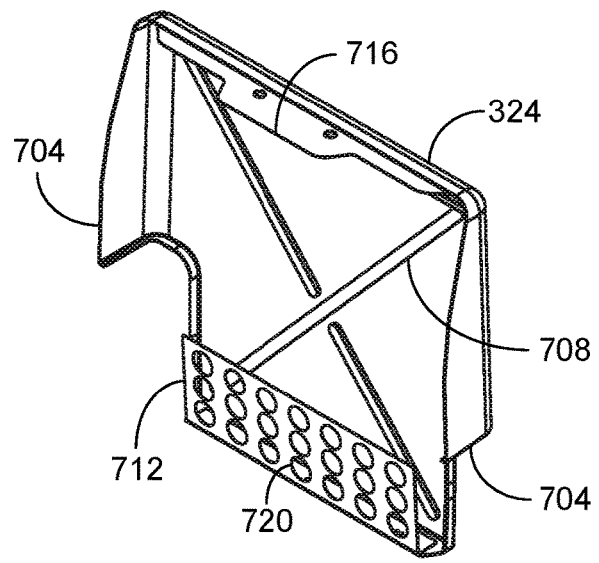
FIG. 7A is a front perspective view of an exemplary back cover.
Figure 7B:
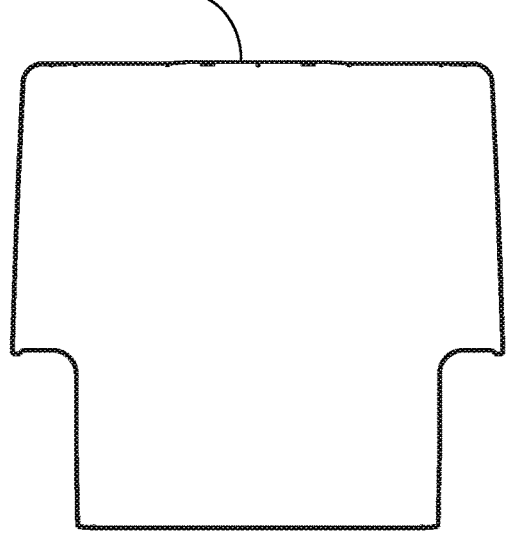
FIG. 7B is a rear view of an exemplary back cover.
Figure 7C:
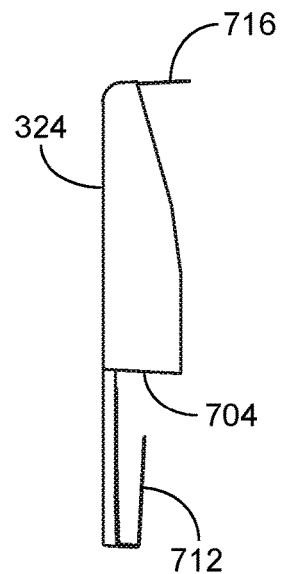
FIG. 7C is a side view of an exemplary back cover.

FIG. 7A illustrates a front perspective view of an exemplary back cover 324. A back cover 324 may be used to cover a back portion of a second passenger seat for aesthetic reasons, functional reasons or both. As can be respectively seen from the rear and side views of FIGS. 7B and 7C, a back cover 324 may cover all or substantially all of a backrest assembly. A back cover 324 may be removable to provide access to components of a second passenger seat.

A back cover 324 may comprise flanges 716, 708, 712 to cover a back portion of a second passenger seat, to attach to a second passenger seat or both. A back cover 324 may also include one or more reinforcement members 708 for structural integrity. One or more openings 720 may be formed in various portions of a back cover 324 to reduce weight.

Figure 8A:
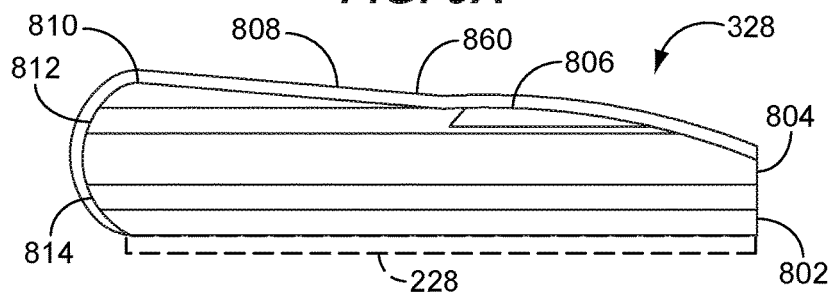
FIG. 8A is a side cross sectional view of an exemplary seat cushion.

FIGS. 8A-8F illustrate exemplary cushioning or coverings 802-858 for various components of a second passenger seat. As described above, one or more coverings 802-858 may be provided, such as in layers or other arrangements. In addition, individual coverings 802-858 may be distinct materials. Referring to FIG. 8A, which is a cross sectional view of an exemplary seat cushion 328, it can be seen that a seat cushion 328 may be formed from one or more coverings 802-812. Individual coverings 802-858 may vary in size and shape, such as shown. As described above, an outermost covering 860 may be fabric, leather, vinyl or other upholstery.

Individual coverings 802-858 will typically be foam, sponge, rubber or other resilient material and may vary in indentation load deflection (ILD) or softness. To illustrate, in an exemplary embodiment, the coverings 802-858 may be:

TABLE 1

Exemplary Covering Details

| Part | Material | Width | ILD |
| --- | --- | --- | --- |
| Covering 802 | DAX FOAM | 1 inch | 55 |
| Covering 804 | DAX FOAM | 2 inch | 26 |
| Covering 806 | CONFOR FOAM | | 40 |
| Covering 808 | DAX FOAM | 0.5 inch | 20 |
| Covering 810 | DAX FOAM | 1 inch | 26 |
| Covering 812 | DAX FOAM | 1 inch | 26 |
| Covering 814 | DAX FOAM | 1 inch | 47 |
| Covering 816 | DAX FOAM | 0.5 inch | 90 |
| Covering 818 | DAX FOAM | 1 inch | 55 |
| Covering 820 | DAX FOAM | 1 inch | 55 |
| Covering 822 | DAX FOAM | 1 inch | 90 |
| Covering 824 | DAX FOAM | 1 inch | 47 |
| Covering 826 | DAX FOAM | 1 inch | 47 |
| Covering 828 | DAX FOAM | 2 inch | 90 |
| Covering 830 | DAX FOAM | 1 inch | 55 |
| Covering 832 | DAX FOAM | 2 inch | 90 |
| Covering 834 | DAX FOAM | 0.5 inch | 90 |
| Covering 836 | DAX FOAM | 2 inch | 26 |
| Covering 838 | DAX FOAM | 0.5 inch | 20 |
| Covering 840 | DAX FOAM | 1 inch | 26 |

TABLE 1-continued

Exemplary Covering Details

| Part | Material | Width | ILD |
| --- | --- | --- | --- |
| Covering 842 | CONFOR FOAM | 0.5 inch | |
| Covering 844 | DAX FOAM | 2 inch | 26 |
| Covering 846 | DAX FOAM | 1 inch | 55 |
| Covering 848 | DAX FOAM | 2 inch | 26 |
| Covering 850 | DAX FOAM | 1 inch | 47 |
| Covering 852 | DAX FOAM | 0.5 inch | 20 |
| Covering 854 | DAX FOAM | 1 inch | 20 |
| Covering 856 | ETHAFOAM | 1 inch | |
| Covering 858 | DAX FOAM | 1 inch | 55 |

Figure 8C:
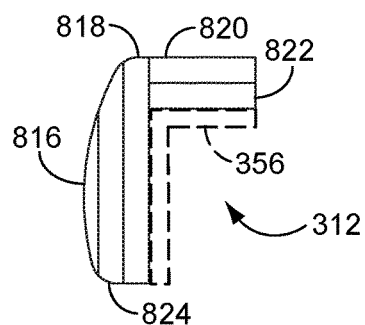
FIG. 8C is a side cross sectional view of an exemplary headrest.
Figure 8D:
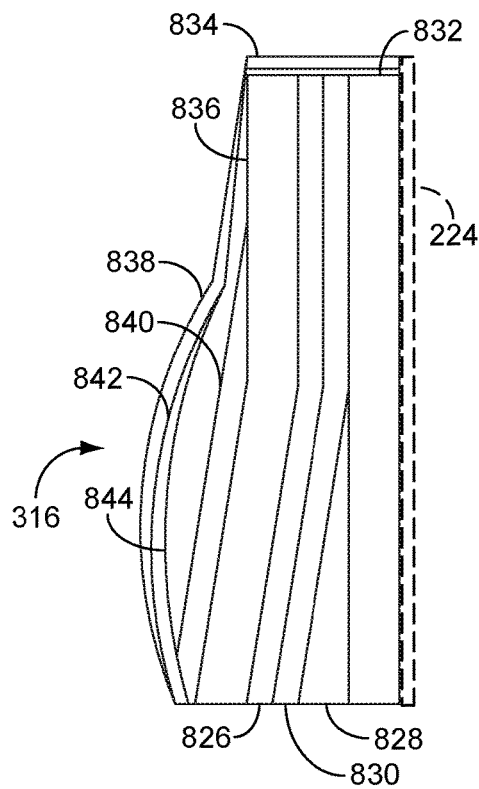
FIG. 8D is a side cross sectional view of an exemplary back cushion.
Figure 8B:
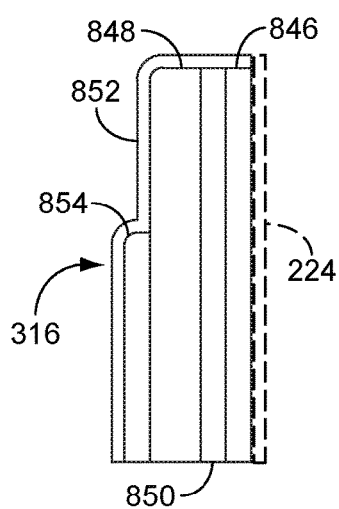
FIG. 8B is a side cross sectional view of an exemplary back cushion.
Figure 8E:
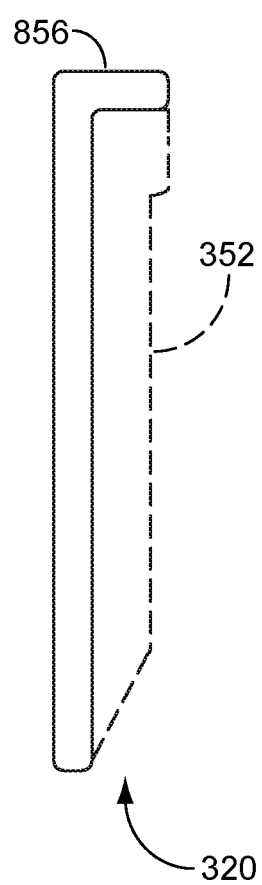
FIG. 8E is a front view of an exemplary armrest assembly.
Figure 8F:
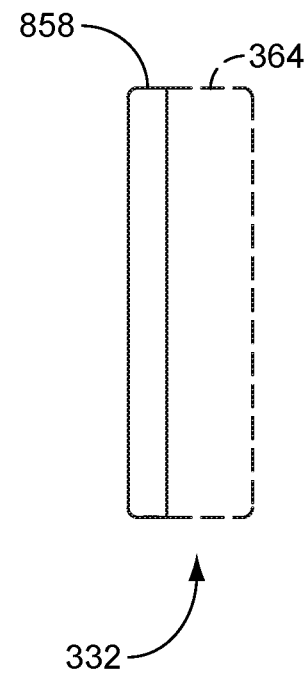
FIG. 8F is a side view of an exemplary footrest.

Coverings 802-858 may be attached to one another by adhesive or other bonding compounds or methods. In addition, a covering 802-858 may be attached to a frame or other structure with adhesive or other bonding compounds or methods. For example, FIG. 8A illustrates a covering 802 attached to a lateral support 228 of a bottom assembly. FIGS. 8B and 8D illustrate exemplary embodiments of a backrest cushion 316 with coverings 832, 846 attached to a backrest frame 224, FIG. 8C illustrates an exemplary embodiment of a headrest 312 with coverings 818, 822 attached to a headrest frame 356, FIG. 8E illustrates an exemplary embodiment of an armrest assembly 320 with a covering 856 attached to an armrest frame 352, and FIG. 8F illustrates an exemplary embodiment of a footrest 332 with a covering 858 attached to a footrest frame 364.

It is contemplated that mechanical fastening may attach a covering 802-858 to each other or another structure. For example, one or more coverings 802-858 may be sewn together with thread, or held together with hook and loop fasteners.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for making an aircraft passenger seat comprising:
    removing one or more coverings from a bottom frame and a backrest frame of a first passenger seat;
    removing one or more armrests from the first passenger seat;
    shortening the backrest frame to form a shortened backrest frame;
    attaching one or more trusses at a distal end of the shortened backrest frame;
    attaching a headrest at the distal end of the shortened backrest frame;
    attaching one or more armrest assemblies to the bottom frame; and
    covering at least the bottom frame and the shortened backrest frame with one or more second coverings, wherein an outermost covering of the one or more second coverings is upholstery.

2. The method of claim 1 further comprising forming a compartment at an exterior surface of the one or more armrest assemblies.

3. The method of claim 1 further comprising securing a back cover at a rear side of the backrest frame.

4. The method of claim 1, wherein the headrest further comprises a downrod that is inserted into a channel of the backrest frame when the headrest is attached to the shortened backrest frame.

5. The method of claim 1 further comprising attaching a base at a bottom end of the bottom frame.

6. The method of claim 5 further comprising installing a shroud at the base to hide the base from view.

7. The method of claim 1 further comprising rotatably attaching a footrest to the bottom frame.

* * * * *